United States Patent
Hollar

(10) Patent No.: US 6,931,536 B2
(45) Date of Patent: Aug. 16, 2005

(54) ENHANCED COPY PROTECTION OF PROPRIETARY MATERIAL EMPLOYING MULTIPLE WATERMARKS

(75) Inventor: Mark A. Hollar, Palo Alto, CA (US)

(73) Assignee: Macrovision Corporation, Santa Clara, CA (US)

( * ) Notice: Subject to any disclaimer, the term of this patent is extended or adjusted under 35 U.S.C. 154(b) by 818 days.

(21) Appl. No.: 09/799,648

(22) Filed: Mar. 6, 2001

(65) Prior Publication Data

US 2002/0126842 A1 Sep. 12, 2002

(51) Int. Cl.⁷ .................................................. H04L 9/00
(52) U.S. Cl. ...................................... 713/176; 713/200
(58) Field of Search .............................. 713/176, 200, 713/178, 179; 380/200–203; 382/100, 232; 705/57–59

(56) References Cited

U.S. PATENT DOCUMENTS 6,272,634 B1 * 8/2001 Tewfik et al. ................ 713/176
6,332,194 B1 * 12/2001 Bloom et al. ................ 713/176
6,359,573 B1 * 3/2002 Taruguchi et al. ............. 341/50

FOREIGN PATENT DOCUMENTS

| EP | 0869454 | 10/1998 |
|---|---|---|
| EP | 1 017049 | 7/2000 |
| WO | WO99 36876 | 7/1999 |
| WO | WO02/29510 | 4/2002 |

* cited by examiner

*Primary Examiner*—Hosuk Song
(74) *Attorney, Agent, or Firm*—James H. Salter; Victor H. Okumoto

(57) ABSTRACT

A method and apparatus for distributing proprietary material employs multiple watermarks embedded in the proprietary material for enhanced copy protection. A first watermark is to be processed by programmable and non-programmable devices configured to process the first watermark for copy protection of the proprietary material. If a programmable device eliminates the first watermark so that unauthorized copies of the proprietary material can be made, then non-programmable devices configured to process a second watermark as well as the first watermark look for and process the second watermark for copy protection of the proprietary material upon their failure to detect the first watermark.

44 Claims, 8 Drawing Sheets

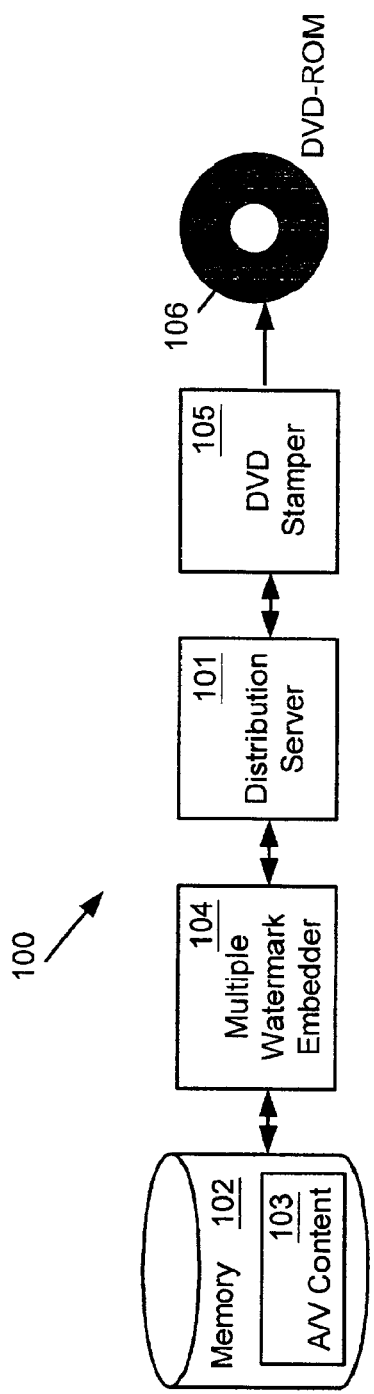
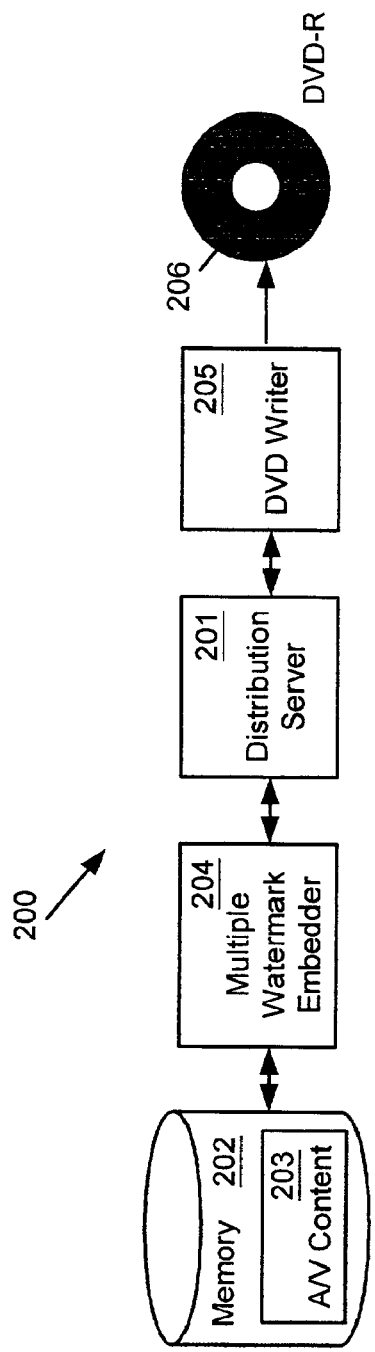

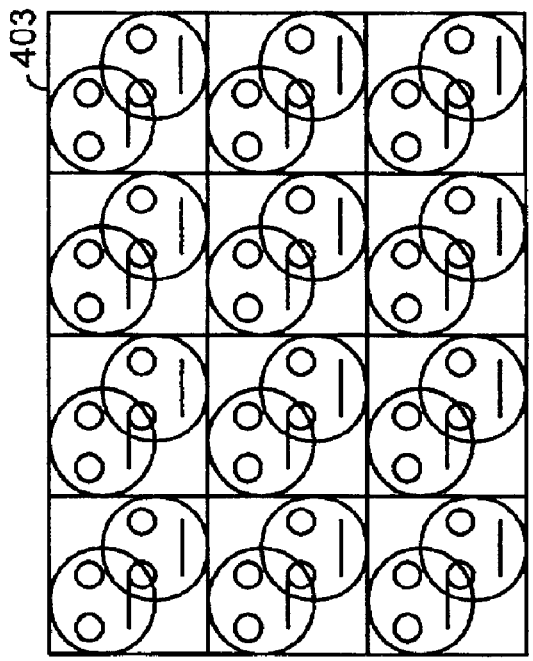
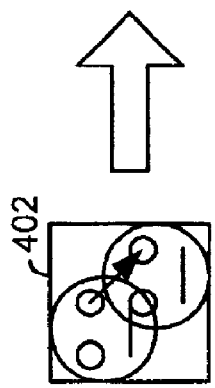
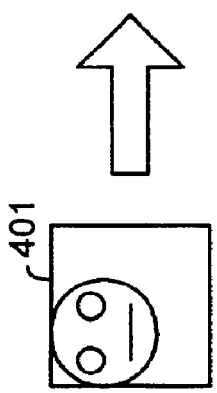
**FIG. 4
Prior Art**

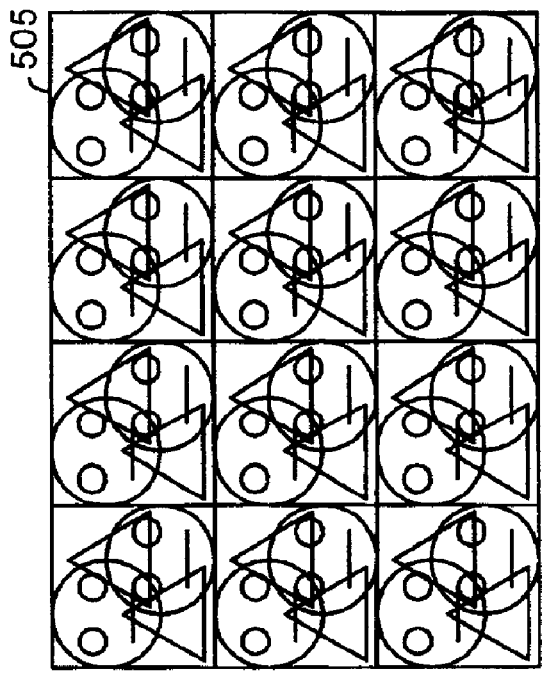
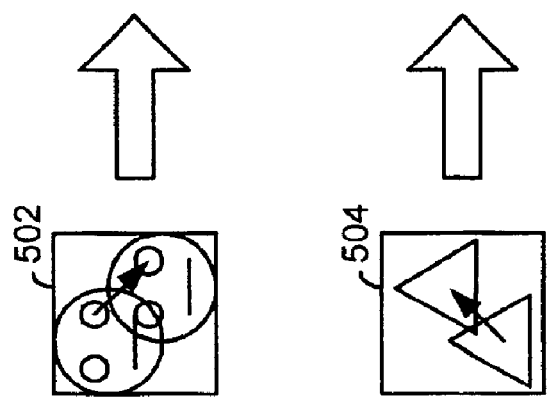
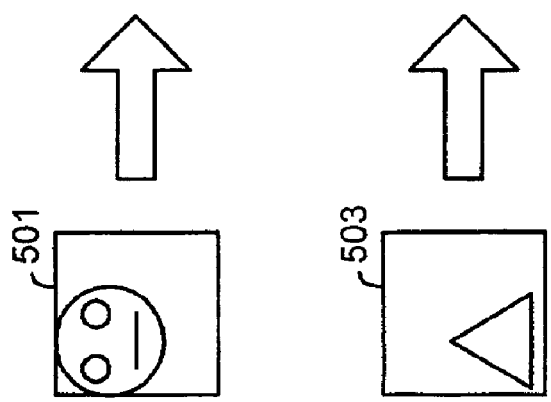
FIG.5

ENHANCED COPY PROTECTION OF PROPRIETARY MATERIAL EMPLOYING MULTIPLE WATERMARKS

FIELD OF THE INVENTION

The present invention generally relates to the distribution and processing of proprietary material and in particular, to methods and apparatuses for respectively distributing and processing proprietary material employing multiple watermarks for enhanced copy protection.

BACKGROUND OF THE INVENTION

Existing and proposed watermarking systems for protecting proprietary material such as multimedia content suffer from the fact that they often provide for watermark detection to be performed in the software domain within a personal computer. A personal computer is a device that contains user configurable software and as such, is subject to tampering and insertion of malicious code. Malicious code is capable of helping analyze the watermark and even rendering a watermark ineffective. In some cases, the watermark system utilizes a "key" or reference pattern to perform its detection function. A software version of the detector thus must utilize a software version of the "key" pattern. If this "key" pattern is successfully reverse engineered, it can be used to remove the watermark, thus removing any protection from copying that was previously afforded.

OBJECTS AND SUMMARY OF THE INVENTION

Accordingly, it is an object of the present invention to provide a method and apparatus for distributing proprietary material with enhanced copy and play protection (cumulatively referred to herein as "copy protection").

Another object is to provide a method and apparatus for processing proprietary material with enhanced copy protection.

These and additional objects are accomplished by the various aspects of the present invention, wherein briefly stated, one aspect is a method for distributing proprietary material employing multiple watermarks for enhanced copy protection, comprising: embedding a first watermark in proprietary material, wherein the first watermark is to be processed by programmable and non-programmable devices configured to process the first watermark for copy protection of the proprietary material; and embedding a second watermark in the proprietary material, wherein the second watermark is to be processed by non-programmable devices configured to process the second watermark for copy protection of the proprietary material in the event that the first watermark is not detected, thereby providing enhanced copy protection of the proprietary material.

Another aspect is an apparatus for distributing proprietary material employing multiple watermarks for enhanced copy protection. Included in the apparatus is means for embedding a first watermark in proprietary material. The first watermark is to be processed by programmable devices and non-programmable devices that are configured to process the first watermark for copy protection of the proprietary material. Also included in the apparatus is means for embedding a second watermark in the proprietary material. The second watermark is to be processed by non-programmable devices configured to process the second watermark for copy protection of the proprietary material in the event that the first watermark is not detected.

Another aspect is an apparatus for distributing proprietary material employing multiple watermarks for enhanced copy protection. The apparatus comprises a computer readable medium having proprietary material with embedded first and second watermarks. The first watermark is to be processed by programmable and non-programmable devices configured to process the first watermark for copy protection of the proprietary material. The second watermark is to be processed by non-programmable devices configured to process the second watermark for copy protection of the proprietary material in the event that the first watermark is not detected.

Another aspect is a method for processing proprietary material employing multiple watermarks for enhanced copy protection, comprising: searching for a first watermark embedded in proprietary material; if the first watermark is detected, then processing the first watermark for copy protection of the proprietary material; if the first watermark is not detected, then searching for a second watermark in the proprietary material; and if the second watermark is detected, then processing the second watermark for copy protection of the proprietary material.

Still another aspect is an apparatus for processing proprietary material employing multiple watermarks for enhanced copy protection. Included in the apparatus is means for searching for a first watermark in proprietary material, and processing the first watermark for copy protection of the proprietary material if the first watermark is detected. Also included in the apparatus is means performed if the first watermark is not detected, for searching for a second watermark in the proprietary material, and processing the second watermark for copy protection of the proprietary material if the second watermark is detected.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 illustrates, as an example, a block diagram of a distribution system for generating copies of proprietary material on read-only or non-recordable media, utilizing aspects of the present invention.

FIG. 2 illustrates, as an example, a block diagram of a distribution system for generating copies of proprietary material on recordable media, utilizing aspects of the present invention.

FIG. 4 illustrates, as an example, a prior art watermarking technique.

FIG. 5 illustrates, as an example, a multiple watermarking technique, utilized by aspects of the present invention.

DETAILED DESCRIPTION OF THE PREFERRED EMBODIMENT

Figure 3:
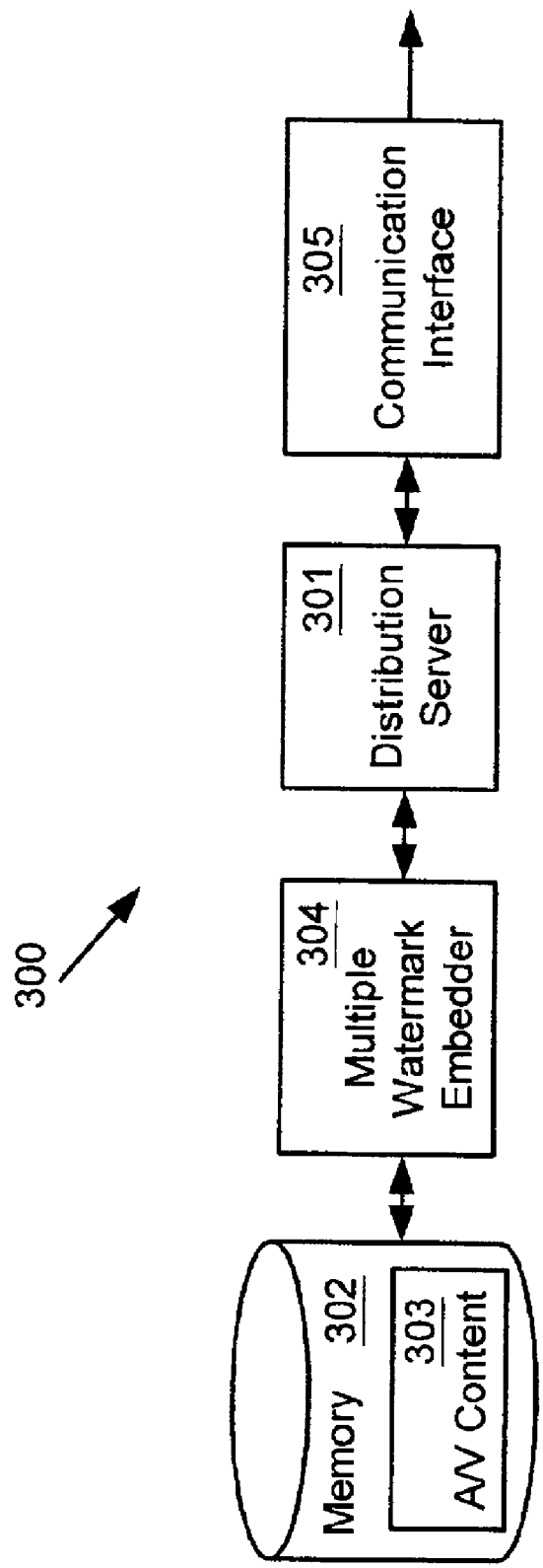
FIG. 3 illustrates, as an example, a block diagram of a distribution system for distributing proprietary material electronically, utilizing aspects of the present invention.

As used herein: the terms "material" and "content" may be used interchangeably; "audio-visual content" or "A/V content" includes audio, visual and other multimedia content including motion pictures, music, the spoken word, photos, and printed text; "proprietary material" means material protected by contract or intellectual property law, and includes A/V content; "programmable devices" means devices that allow the user to modify or configure at will the software, firmware and hardware operating in the device, such as personal computers and other computers; "non-programmable devices" means devices that have no user configurable software, firmware and hardware such as certain devices that process proprietary material on tangible media such as compact disc ("CD") players, digital versatile disc ("DVD") players, audio tape players, and video tape players, and other devices that process proprietary material received electronically such as information appliances and set top-boxes. Thus, as used herein, a programmable device is a device that has user configurable software installed on it, while a non-programmable device generally operates certain applications that are either pre-installed or installed under the control of a party other than the user, such as a system operator or service provider.

FIG. 1 illustrates, as an example, a block diagram of a distribution system 100 for generating copies of proprietary material such as A/V content 103 on read-only memory ("ROM") or non-recordable media such as, for example, DVD-ROM 106. The proprietary material is stored in a memory 102, which is typically a hard disk or other mass storage medium. A distribution server 101, which is typically a computer such as a workstation or personal computer, employs a multiple watermark embedder 104 to embed multiple watermarks in a copy of the proprietary material 103 for distribution. Multiple watermarks are used in the present invention with restrictions placed on which type of watermark key pattern is available in different domains. In particular, by reserving a secondary watermark key for certain non-programmable devices such as consumer electronic devices, a backup mechanism in the non-programmable devices can be implemented in the event that malicious software has deleted a primary watermark used by both programmable and non-programmable devices in the proprietary material for copy protection of the proprietary material. The proprietary material with embedded watermarks is then provided to a DVD stamper 105 to generate the DVD-ROM 106.

FIG. 2 illustrates, as an example, a block diagram of a distribution system 200 for generating copies of proprietary material on recordable media such as, for example, DVD-R 206. Like the distribution system 100, the proprietary material is stored in a memory 202, which is typically a hard disk or other mass storage medium. A distribution server 201, which is typically a computer such as a workstation or personal computer, employs a multiple watermark embedder 204 to embed multiple watermarks in a copy of the proprietary material 203 for distribution. Unlike the distribution system 100, however, the proprietary material with embedded watermarks is then provided to a DVD writer 205 to generate the DVD-R 206.

FIG. 3 illustrates, as an example, a block diagram of a distribution system 300 for distributing proprietary material 303 electronically. Like the distribution system 100, the proprietary material is stored in a memory 302, which is typically a hard disk or other mass storage medium. A distribution server 301, which is typically a computer such as a workstation or personal computer, employs a multiple watermark embedder 304 to embed multiple watermarks in a copy of the proprietary material 303 for distribution. Unlike the distribution system 100, however, the proprietary material with embedded watermarks is then provided to a communication interface 305 for distribution via, for examples, the internet or direct dial-up through telephone modem, cable modem, DSL modem, or satellite link.

FIG. 4 illustrates, as an example, a prior art watermarking technique. First, a basic pattern or key 401 is selected. Generally, this is a fairly large patch with pseudo-noise characteristics. In this example, the basic pattern is a 128-pixel by 128-pixel face-like pattern. As depicted in 402, the basic pattern is then shifted and the shifted pattern added to or combined with the original pattern. The shift vector (depicted by arrow in 402) represents the message to be conveyed. When shifting the pattern, the right edge of the pattern wraps back to the left edge, and the bottom edge of the pattern wraps back to the top. Thus, the 128-pixel by 128-pixel pattern provides 128×128 possible shift vectors or messages. Finally, as depicted in 403, the basic pattern and cyclically shifted pattern are embedded in the proprietary material by tiling the combined pattern over the proprietary material.

FIG. 5 illustrates, as an example, a multiple watermarking technique useful with the present invention. In this example, a first watermark having a face-like basic pattern 501 is shifted to indicate a message and combined with the original face-like pattern to form a combined pattern 502, in a manner as described in reference to FIG. 4. This first watermark is the primary watermark that programmable and non-programmable devices should process for copy protection of the proprietary material. Since the first watermark is to be processed by programmable devices such as a personal computer, it is denoted herein as $W_{PC}$. A second watermark having a triangle basic pattern 503 is also shifted to indicate a message and combined with the original triangle pattern to form a combined pattern 504, also in a manner as described in reference to FIG. 4. This second watermark is the secondary watermark that certain non-programmable devices should process for copy protection of the proprietary material in the event that the first or primary watermark is not detected for some reason. Since the second watermark is to be processed by non-programmable devices such as a consumer electronic device, it is denoted herein as $W_{CE}$. As depicted in 505, the first and second watermarks are then embedded in the proprietary material by tiling their combined patterns over the proprietary material.

Although not depicted, third and more watermarks may also be embedded in the proprietary material. In such cases, each additional watermark may be restricted to a certain type or manufacturer of a non-programmable device. As an example, the second watermark might be restricted to DVD players, a third watermark might be restricted to CD players, a fourth watermark might be restricted to video tape players, and a fifth watermark might be restricted to audio tape players. As another example, the second watermark might be restricted to DVD, CD, video tape or audio tape players of a first format, and a third watermark might be restricted to DVD, CD, video tape or audio tape players of a second format.

As can be readily appreciated, excessive multiple watermarking can result in unacceptable visual and/or auditory transparency. Therefore, the added security or flexibility that third or more watermarks might provide should be weighed against any such degradation in the playback or re-recording (if authorized) of the proprietary material.

Figure 6:
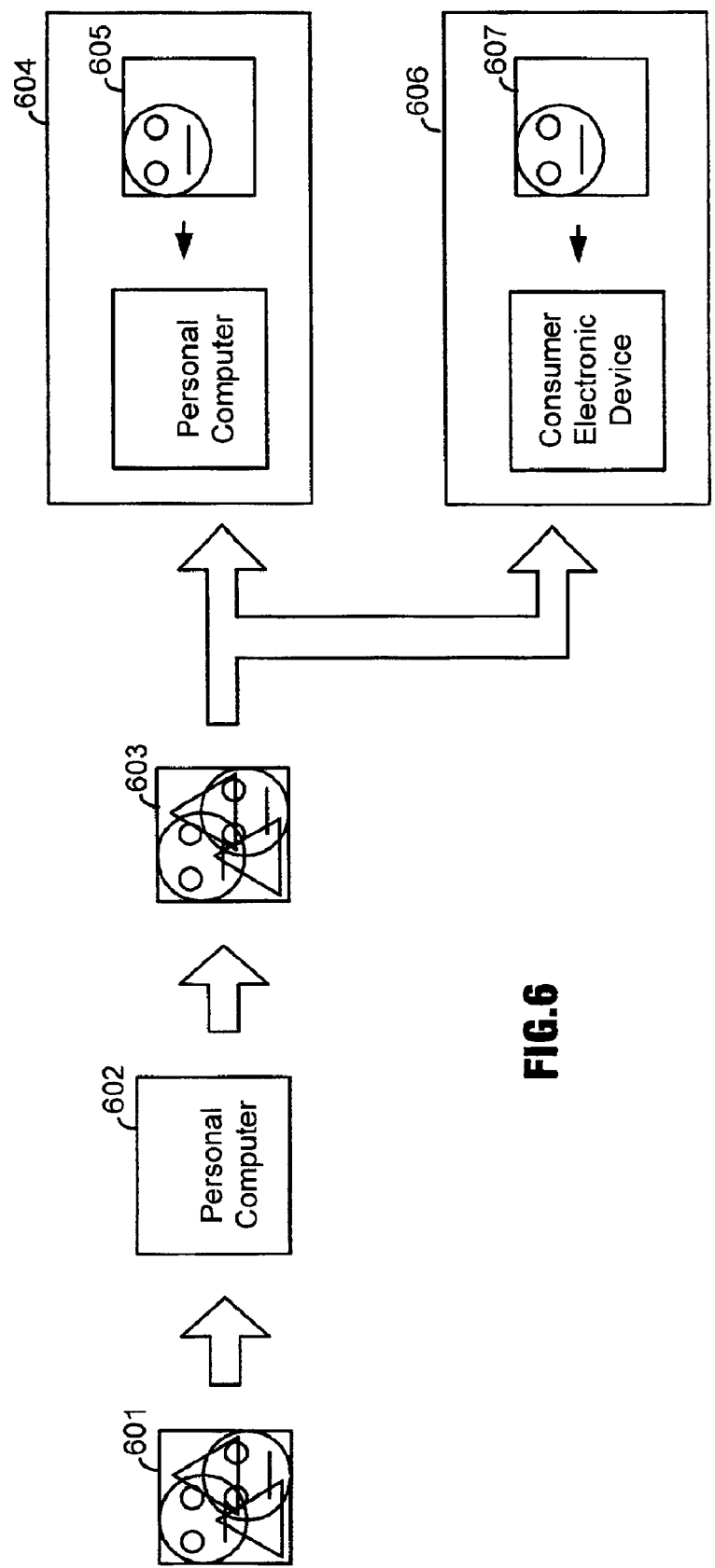
FIG. 6 illustrates, as an example, a block diagram of a proprietary material as it flows through a non-malicious intermediary personal computer to another personal computer and consumer electronic device, utilizing aspects of the present invention.

FIG. 6 illustrates, as an example, a block diagram of a proprietary material flow through a non-malicious programmable device such as personal computer 602 to a representative programmable device such as personal computer 604 and a representative non-programmable device such as consumer electronic device 606. In this example, no attack on the security of the watermark has occurred. The watermark pattern 601 embedded in the proprietary material received by the personal computer 602 includes two watermark messages carried by the two types of watermarks, $W_{PC}$ and $W_{CE}$. While sometimes a watermark message may indicate to a compliant device that no storage, or even no re-transmittal of the proprietary material is permitted, in other cases, the watermark message may allow for one copy to be made. In this example, retransmission is allowed and the watermark pattern 603 embedded in the proprietary material that is re-transmitted by the personal computer 602 is identical to the original watermark pattern 601.

If the re-transmitted proprietary material is provided to personal computer 604, the personal computer 604 will use its stored reference pattern 605 to extract the message transmitted by the watermark $W_{PC}$ included in the watermark 603. Likewise, if the re-transmitted proprietary material is provided to consumer electronic device 606, the consumer electronic device 606 will use its stored reference pattern 607 to extract the message transmitted by the watermark $W_{PC}$ included in the watermark 603. It should be noted in this example, that while the consumer electronic device 606 also has a second stored reference pattern for extracting the message transmitted by the watermark $W_{CE}$ included in the watermark 603, it never needs to use it. It is latent in this case and available to provide additional copy protection should the watermark $W_{PC}$ fail to be detected. Programmable and non-programmable devices that are equipped with such a stored reference pattern as 605 and 607, respectively, and programmed to process a message extracted by it from a first watermark such as $W_{PC}$, are referred to herein as being configured to process the first watermark for copy protection of the proprietary material.

Figure 7:
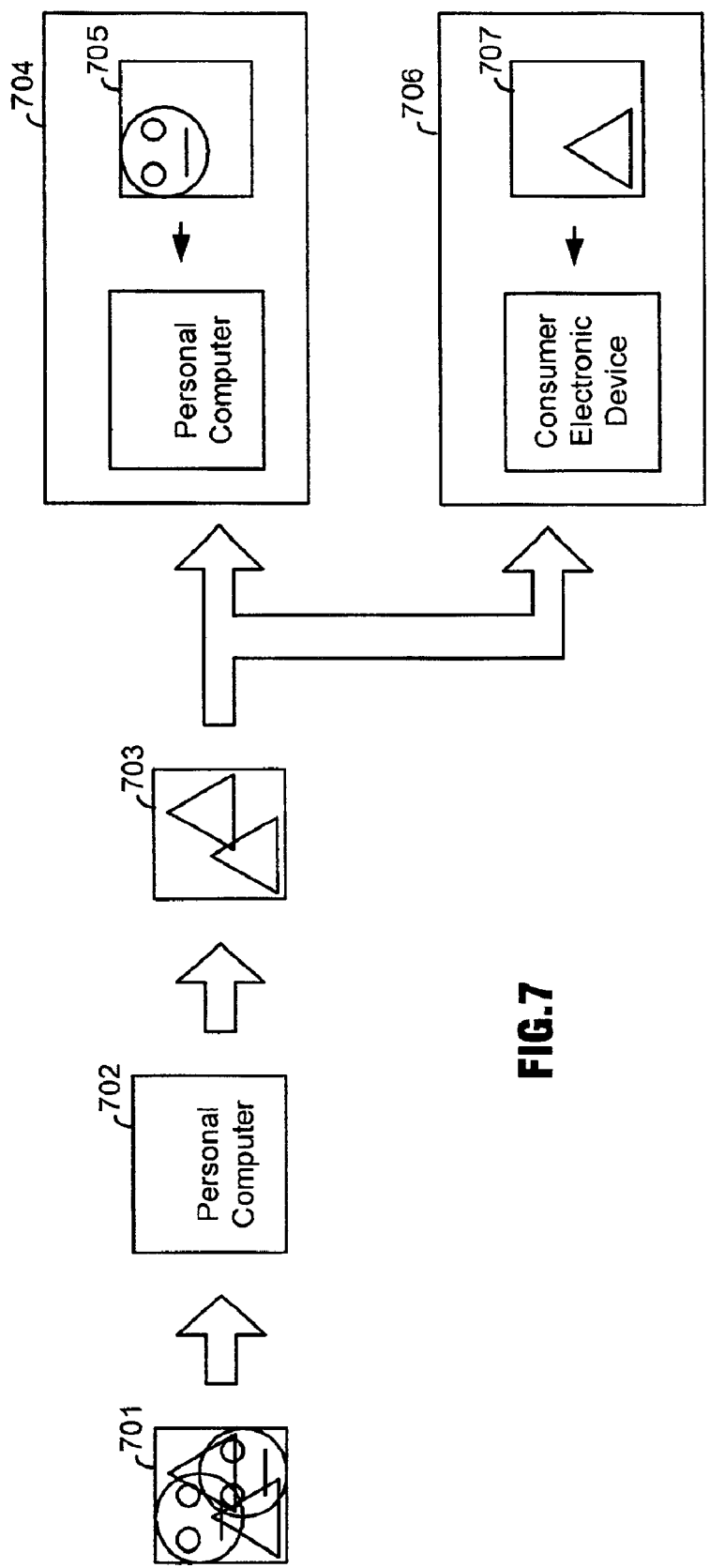
FIG. 7 illustrates, as an example, a block diagram of a proprietary material as it flows through a malicious intermediary personal computer to another personal computer and consumer electronic device, utilizing aspects of the present invention.

FIG. 7 illustrates, as an example, a block diagram of a proprietary material flow through a malicious programmable device such as personal computer 702 to a representative programmable device such as personal computer 704 and a representative non-programmable device such as consumer electronic device 706. In this example, an attack on the security of the watermark has occurred. The embedded watermark pattern 701 received by the personal computer 702 includes two watermark messages carried by the two types of watermarks, $W_{PC}$ and $W_{CE}$, but the embedded watermark pattern 703 re-transmitted by the personal computer 702 includes only the watermark $W_{CE}$. The personal computer 702 in this case has a user-configured piece of software that has removed the watermark $W_{PC}$.

Now, if the re-transmitted proprietary material is provided to personal computer 704, the personal computer 704 will try to use its stored reference pattern 705 to find the watermark $W_{PC}$ in the proprietary material and extract the message transmitted by the watermark $W_{PC}$. The personal computer 704 will fail, however, to detect the watermark $W_{PC}$ since the watermark $W_{PC}$ has been deleted. Consequently, copy protection of the proprietary material will fail in this case.

On the other hand, if the re-transmitted proprietary material is provided to consumer electronic device 706, the consumer electronic device 706 will first try to use a stored reference pattern (not shown) identical to 705 to find the watermark $W_{PC}$ in the proprietary material and extract the message transmitted by the watermark $W_{PC}$. Like the personal computer 704, the consumer electronic device 706 will fail to detect the watermark $W_{PC}$ since the watermark $W_{PC}$ has been deleted. In this case, however, the consumer electronic device 706 will then try to use a second stored reference pattern 707 for extracting the message transmitted by the watermark $W_{CE}$ included in the watermark 703. Since the watermark $W_{CE}$ is still embedded in the proprietary material, the consumer electronic device 706 will be successful this time. Non-programmable devices that are equipped with such a second stored reference pattern as 707, and programmed to process a message extracted by it from a second watermark such as $W_{CE}$, are referred to herein as being configured to process the second watermark for copy protection of the proprietary material.

Figure 8:
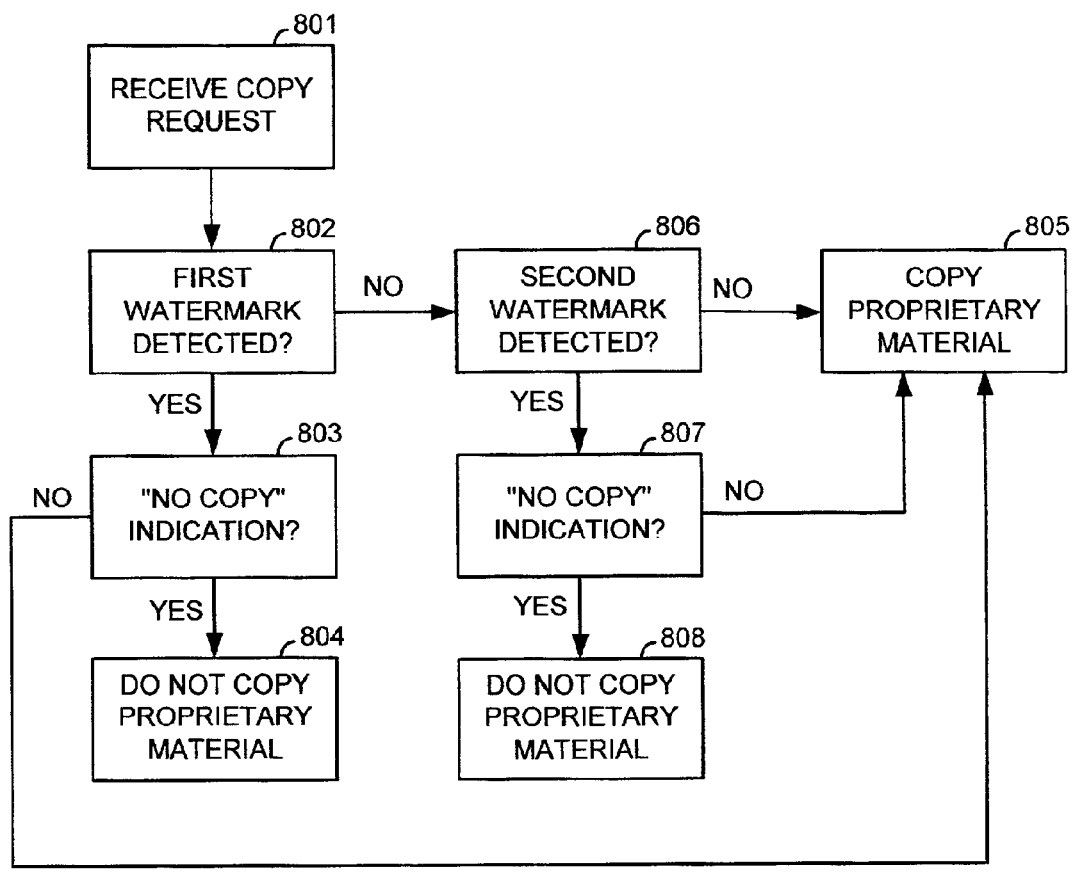
FIG. 8 illustrates, as an example, a flow diagram of a method of processing proprietary material to prevent unauthorized copying of the proprietary material, utilizing aspects of the present invention.

FIG. 8 illustrates, as an example, a flow diagram of a method of processing proprietary material to prevent unauthorized copying of the proprietary material. In 801, a request to make a copy of the proprietary material is received. In 802, searching for a first watermark such as $W_{PC}$ embedded in the proprietary material is performed. If the first watermark is detected, then in 803, a message included in the first watermark is extracted. If the message includes a "no copy" indication, then in 804, the request to copy the proprietary material is refused, and if the message does not include a "no copy" indication, then in 805, the request to copy the proprietary material is granted or performed.

On the other hand, if the first watermark is not detected, then in 806, searching for a second watermark such as $W_{CE}$ embedded in the proprietary material is performed. If the second watermark is detected, then in 807, a message included in the first watermark is extracted. If the message includes a "no copy" indication, then in 808, the request to copy the proprietary material is refused, and if the message does not include a "no copy" indication, then in 805, the request to copy the proprietary material is granted or performed.

Figure 9:
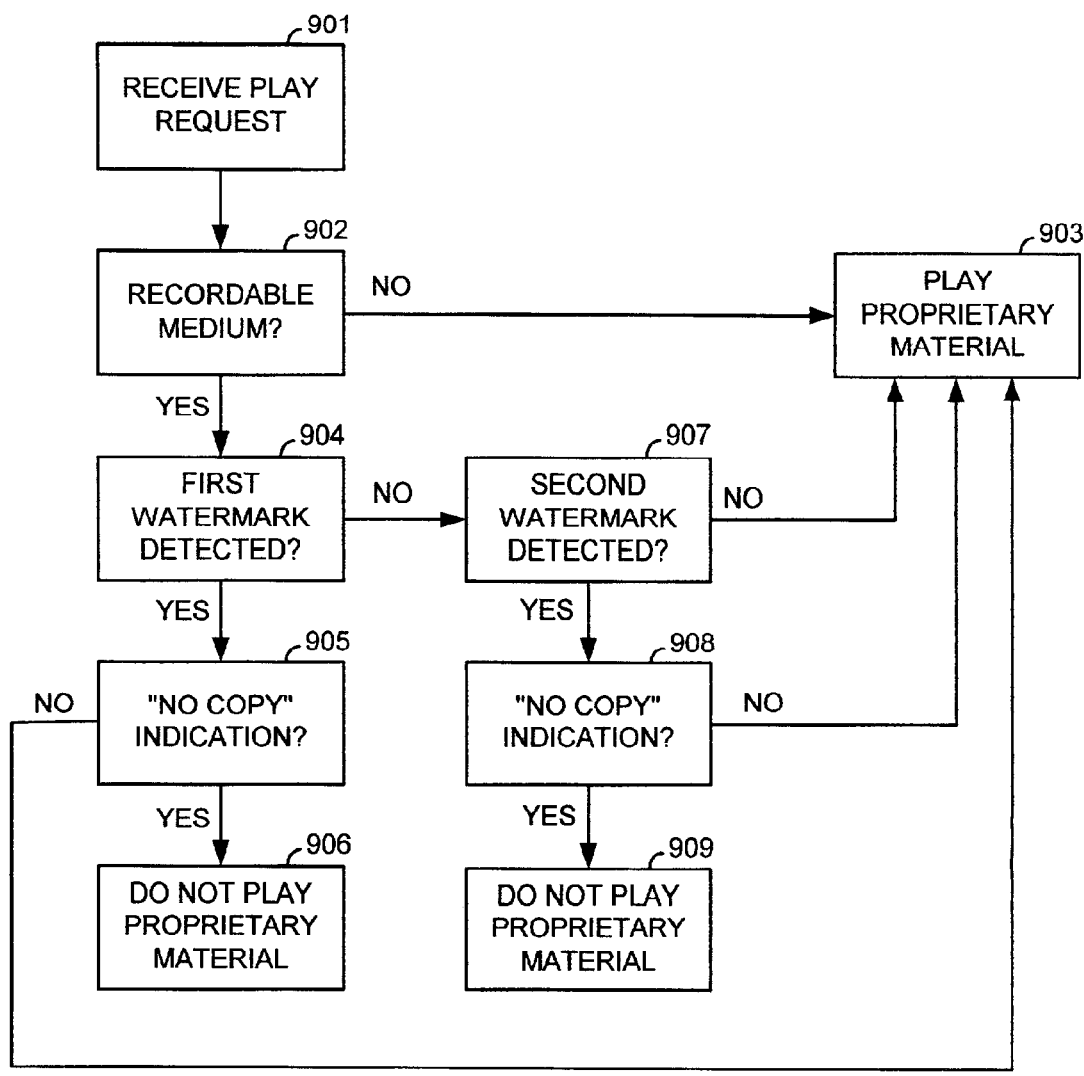
FIG. 9 illustrates, as an example, a flow diagram of a method of processing proprietary material to prevent unauthorized playing of the proprietary material, utilizing aspects of the present invention.

FIG. 9 illustrates, as an example, a flow diagram of a method of processing proprietary material to prevent unauthorized playing of the proprietary material. In 901, a request to play the proprietary material is received. In 902, it is first determined whether the medium upon which the proprietary material resides is a recordable medium. If the medium is not a recordable medium, then in 903, the request to play the proprietary material is granted or performed. If the medium is a recordable medium, however, then in 904, searching for a first watermark such as $W_{PC}$ embedded in the proprietary material is performed. If the first watermark is detected, then in 905, a message included in the first watermark is extracted. If the message includes a "no copy" indication, then in 906, the request to play the proprietary material is refused. However, if the message does not include a "no copy" indication, then in 903, the request to play the proprietary material is granted or performed.

On the other hand, if the first watermark is not detected, then in 907, searching for a second watermark such as $W_{CE}$ embedded in the proprietary material is performed. If the second watermark is detected, then in 908, a message included in the first watermark is extracted. If the message includes a "no copy" indication, then in 909, the request to play the proprietary material is refused. However, if the message does not include a "no copy" indication, then in 903, the request to play the proprietary material is granted or performed.

The methods described in reference to FIGS. 8 and 9 are performed, for example, by non-programmable devices such as consumer electronic device 706 in FIG. 7, and conventionally implemented within such devices by a processor and software, processor and firmware, stand-alone logic, or combination thereof.

Although the various aspects of the invention have been described with respect to preferred embodiments, it will be understood that the invention is entitled to full protection within the full scope of the appended claims.

I claim:

1. A method for preparing proprietary material employing multiple watermarks for enhanced copy protection, comprising:

embedding a first watermark in proprietary material, wherein said first watermark includes copy control information indicating whether programmable and non-programmable devices configured to process said first watermark for copy protection of said proprietary material are allowed to copy said proprietary material; and embedding a second watermark in said proprietary material, wherein said second watermark includes copy control information indicating whether a first group of said non-programmable devices configured to process said second watermark for copy protection of said proprietary material in the event that said first watermark is not detected are allowed to copy said proprietary material, thereby providing enhanced copy protection of said proprietary material.

2. The method according to claim 1, wherein said proprietary material includes video content.

3. The method according to claim 1, wherein said proprietary material includes audio content.

4. The method according to claim 1, wherein said proprietary material includes picture content.

5. The method according to claim 1, wherein said proprietary material includes text content.

6. The method according to claim 1, wherein said programmable devices comprise personal computers.

7. The method according to claim 1, wherein said non-programmable devices comprise consumer electronic devices.

8. The method according to claim 1, further comprising:

embedding a third watermark in said proprietary material, wherein said third watermark includes copy control information indicating whether a second group of said non-programmable devices configured to process said third watermark for copy protection of said proprietary material in the event that said first watermark is not detected are allowed to copy said proprietary material, thereby providing enhanced copy protection of said proprietary material.

9. An apparatus for preparing proprietary material employing multiple watermarks for enhanced copy protection, comprising:

means for embedding a first watermark in proprietary material, wherein said first watermark includes copy control information indicating whether programmable devices and non-programmable devices configured to process said first watermark for copy protection of said proprietary material are allowed to copy said proprietary material; and means for embedding a second watermark in said proprietary material, wherein said second watermark includes copy control information indicating whether a first group of said non-programmable devices configured to process said second watermark for copy protection of said proprietary material in the event that said first watermark is not detected are allowed to copy said proprietary material.

10. The apparatus according to claim 9, wherein said proprietary material includes video content.

11. The apparatus according to claim 9, wherein said proprietary material includes audio content.

12. The apparatus according to claim 9, wherein said proprietary material includes picture content.

13. The apparatus according to claim 9, wherein said proprietary material includes text content.

14. The apparatus according to claim 9, wherein said programmable devices comprise programmable computers.

15. The apparatus according to claim 9, wherein said non-programmable devices comprise consumer electronic devices.

16. The apparatus according to claim 9, further comprising means for embedding a third watermark in said proprietary material, wherein said third watermark includes copy protection information indicating whether a second group of said non-programmable devices configured to process said third watermark for copy protection of said proprietary material in the event that said first watermark is not detected are allowed to copy said proprietary material.

17. An apparatus for preparing proprietary material employing multiple watermarks for enhanced copy protection, comprising a computer readable medium having proprietary material with embedded first and second watermarks, wherein said first watermark includes copy control information indicating whether programmable and non-programmable devices configured to process said first watermark for copy protection of said proprietary material are allowed to copy said proprietary material, and said second watermark includes copy control information indicating whether a first group of said non-programmable devices configured to process said second watermark for copy protection of said proprietary material in the event that said first watermark is not detected are allowed to copy said proprietary material.

18. The apparatus according to claim 17, wherein said proprietary material includes video content.

19. The apparatus according to claim 17, wherein said proprietary material includes audio content.

20. The apparatus according to claim 17, wherein said proprietary material includes picture content.

21. The apparatus according to claim 17, wherein said proprietary material includes text content.

22. The apparatus according to claim 17, wherein said programmable devices comprise programmable computers.

23. The apparatus according to claim 17, wherein said non-programmable devices comprise consumer electronic devices.

24. The apparatus according to claim 17, wherein said proprietary material has a third embedded watermark including copy control information indicating whether a second group of said non-programmable devices configured to process said third watermark for copy protection of said proprietary material in the event that said first watermark is not detected are allowed to copy said proprietary material.

25. A method for processing proprietary material employing multiple watermarks for enhanced copy protection, comprising:

searching for a first watermark embedded in proprietary material;

if said first watermark is detected, then processing said first watermark for copy protection of said proprietary material;

if said first watermark is not detected, then searching for a second watermark in said proprietary material; and if said second watermark is detected, then processing said second watermark for copy protection of said proprietary material.

26. The method according to claim 25, wherein said proprietary material includes video content.

27. The method according to claim 25, wherein said proprietary material includes audio content.

28. The method according to claim 25, wherein said proprietary material includes picture content.

29. The method according to claim 25, wherein said proprietary material includes text content.

30. The method according to claim 25, wherein said processing said first watermark for copy protection of said proprietary material, comprises denying a copy request for said proprietary material if said first watermark includes a no-copy indication.

31. The method according to claim 25, wherein said processing said second watermark for copy protection of said proprietary material, comprises denying a copy request for said proprietary material if said second watermark includes a no-copy indication.

32. The method according to claim 25, further comprising determining whether said proprietary material is stored on a recordable medium.

33. The method according to claim 32, wherein said processing said first watermark for copy protection of said proprietary material, comprises:

if said proprietary material is stored on a non-recordable medium, then complying with a play request for said proprietary material; and if said proprietary material is stored on a recordable medium and said first watermark is detected to have a no-copy indication, then denying a play request for said proprietary material.

34. The method according to claim 32, wherein said processing said second watermark for copy protection of said proprietary material, comprises:

if said proprietary material is stored on a non-recordable medium, then complying with a play request for said proprietary material; and if said proprietary material is stored on a recordable medium and said second watermark is detected to have a no-copy indication, then denying a play request for said proprietary material.

35. An apparatus for processing proprietary material employing multiple watermarks for enhanced copy protection, comprising a non-programmable device configured to:

search for a first watermark in proprietary material, and process said first watermark for copy protection of said proprietary material if said first watermark is detected; and if said first watermark is not detected, search for a second watermark in said proprietary material, and process said second watermark for copy protection of said proprietary material if said second watermark is detected.

36. The apparatus according to claim 35, wherein said proprietary material includes video content.

37. The apparatus according to claim 35, wherein said proprietary material includes audio content.

38. The apparatus according to claim 35, wherein said proprietary material includes picture content.

39. The apparatus according to claim 35, wherein said proprietary material includes text content.

40. The apparatus according to claim 35, wherein said non-programmable device is a consumer electronic device.

41. The apparatus according to claim 35, wherein said non-programmable device is further configured to deny a copy request for said proprietary material if said first watermark includes a no-copy indication.

42. The apparatus according to claim 35, wherein said non-programmable device is further configured to deny a copy request for said proprietary material if said second watermark includes a no-copy indication.

43. The apparatus according to claim 35, wherein said non-programmable device is further configured to:

comply with a play request for said proprietary material if said proprietary material is stored on a non-recordable medium; and deny a play request for said proprietary material if said proprietary material is stored on a recordable medium and said first watermark is detected to have a no-copy indication.

44. The apparatus according to claim 35, wherein said non-programmable device is further configured to:

comply with a play request for said proprietary material if said proprietary material is stored on a non-recordable medium; and deny a play request for said proprietary material if said proprietary material is stored on a recordable medium and said second watermark is detected to have a no-copy indication.

* * * * *